US006901698B2

(12) United States Patent
Manning

(10) Patent No.: US 6,901,698 B2
(45) Date of Patent: Jun. 7, 2005

(54) IRRIGATION DEVICE AND SYSTEM

(76) Inventor: Harold Manning, 12347 Potts La., King George, VA (US) 22485

(*) Notice: Subject to any disclaimer, the term of this patent is extended or adjusted under 35 U.S.C. 154(b) by 0 days.

(21) Appl. No.: 10/102,872

(22) Filed: Mar. 22, 2002

(65) Prior Publication Data

US 2003/0177695 A1 Sep. 25, 2003

(51) Int. Cl.[7] .......................... A01G 29/00; A01G 25/00
(52) U.S. Cl. ................ 47/48.5; 47/79; 47/80; 138/DIG. 8; 138/139; 239/542; 239/726; 405/35; 2/335; 248/75
(58) Field of Search ................ 138/DIG. 8, 139; 239/542, 726; 47/79, 80, 48.5, 21.1; 405/35; 248/75; D23/266; 2/335

(56) References Cited

U.S. PATENT DOCUMENTS

| | | | | |
|---|---|---|---|---|
| 865,355 A | * | 9/1907 | Callmann et al. ............ 239/588 |
| 1,484,575 A | * | 2/1924 | Shulin ......................... 239/602 |
| 2,277,864 A | * | 3/1942 | Horvath ...................... 138/110 |
| 2,755,985 A | * | 7/1956 | Finegan | |
| D184,225 S | * | 1/1959 | Greczin | |
| 2,954,194 A | * | 9/1960 | Alfano | |
| 2,998,028 A | * | 8/1961 | Rohde ......................... 138/109 |
| 3,032,357 A | * | 5/1962 | Shames et al. ............. 285/114 |
| 3,134,233 A | * | 5/1964 | Morrison | |
| 3,402,741 A | * | 9/1968 | Yurdin ......................... 138/118 |
| 3,482,785 A | * | 12/1969 | Cahpin et al. | |
| 3,876,146 A | * | 4/1975 | Pacheco ....................... 239/145 |
| 3,972,757 A | * | 8/1976 | Derderian et al. ........... 156/143 |
| 4,016,677 A | * | 4/1977 | Julinot ............................ 47/64 |
| 4,235,561 A | * | 11/1980 | Peterson ........................ 405/45 |
| 4,307,754 A | * | 12/1981 | Muratsubaki ................ 138/108 |
| 4,327,775 A | * | 5/1982 | Tally ............................ 138/103 |
| 4,763,842 A | * | 8/1988 | Dunn ........................... 239/542 |
| 4,843,757 A | * | 7/1989 | Hara .......................... 47/48.5 |
| 4,920,694 A | * | 5/1990 | Higa ............................. 47/58 |
| 5,069,388 A | * | 12/1991 | Prassas et al. .............. 239/145 |
| 5,148,628 A | * | 9/1992 | Wulkowicz .................. 47/48.5 |
| 5,246,254 A | * | 9/1993 | LoJacono et al. ............. 285/16 |
| 5,755,383 A | * | 5/1998 | Joseph ........................ 239/276 |
| 5,768,824 A | * | 6/1998 | Matz ............................. 47/33 |
| 5,803,129 A | * | 9/1998 | Coronado et al. ........... 138/125 |
| 5,894,866 A | * | 4/1999 | Horst et al. ................. 138/172 |
| 5,956,893 A | * | 9/1999 | Harrison ........................ 47/39 |
| 6,023,883 A | * | 2/2000 | Bacon ......................... 47/48.5 |
| 6,036,104 A | * | 3/2000 | Shih ............................. 239/63 |
| 6,079,156 A | * | 6/2000 | Colovic ......................... 47/81 |
| 6,453,607 B1 | * | 9/2002 | Dewey ........................ 47/48.5 |
| 6,568,610 B1 | * | 5/2003 | Ericksen ..................... 239/588 |

FOREIGN PATENT DOCUMENTS

| | | | | |
|---|---|---|---|---|
| DE | 3806973 | * | 9/1989 | ......... A01G/25/06 |
| SU | 1697634 | * | 1/1990 | ......... A01G/25/02 |

* cited by examiner

Primary Examiner—Peter M. Poon
Assistant Examiner—Andrea M. Valenti
(74) Attorney, Agent, or Firm—William L. Klima

(57) ABSTRACT

The present invention is directed to an irrigation device and irrigation system. More specifically, the present invention is directed to a weep or tear type irrigation device and irrigation system.

15 Claims, 4 Drawing Sheets

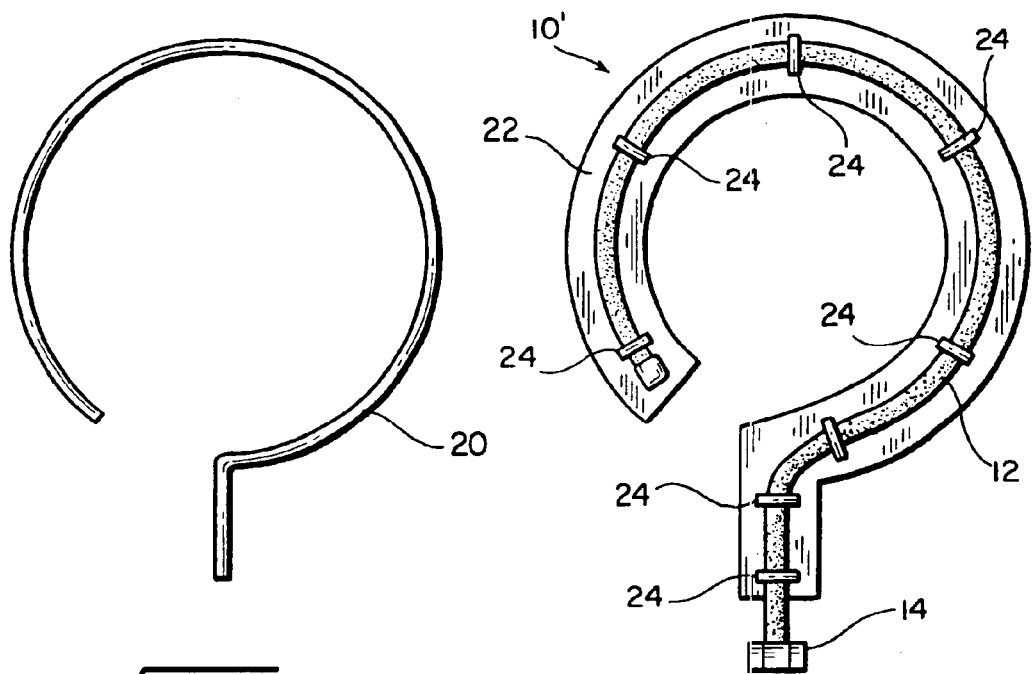
FIG. 4
FIG. 5
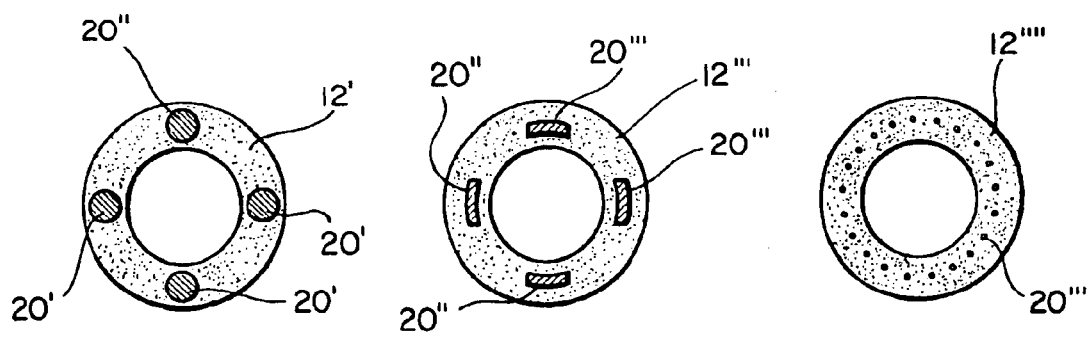
FIG. 6
FIG. 7
FIG. 8

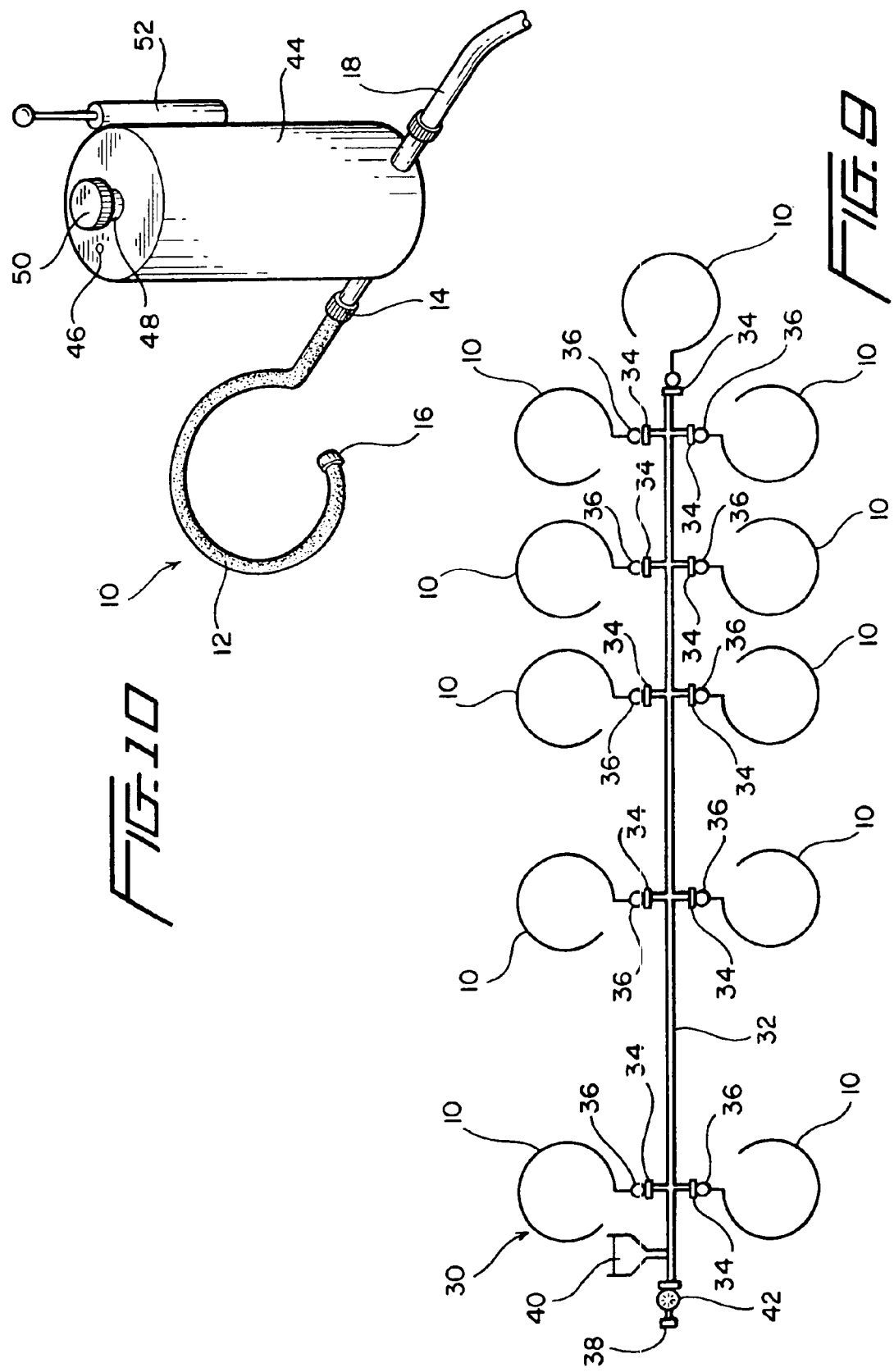

IRRIGATION DEVICE AND SYSTEM

FIELD OF THE INVENTION

The present invention is directed to an irrigation device and irrigation system. More specifically, the present invention is directed to a weep or tear type irrigation device and irrigation system.

BACKGROUND OF THE INVENTION

Currently, there exists a wide variety of different devices and systems for irrigating lawns, flower beds, bushes, trees, crops and various other types of plants.

There exists conventional garden hoses made of a flexible plastic or rubber hose material having a male connector on one end and a female connector at an opposite end. This hose material is made to be water impenetrable so that water does not leak from the hose as it passes from one end to the other, and serves as a conduit for conveying water from point A to point B. Another conventional hose available is a soaker type hose having a male connector at one end and female connector at an opposite end. The hose material of the soaker type hose is purposely configured, constructed, designed or otherwise selected so that water passes through the wall of the hose when water is fed into one end of the hose and the opposite end of the hose is plugged or blocked. The conventional soaker hose is a flexible hose that can be bent into various shapes, and is typically utilized above ground. For example, the soaker hose can be threaded around plants and bushes of a planting bed.

There exists many versions of water sprinklers for directing water into the air to then fall upon the ground and irrigate same. However, most above ground and below ground sprinkler systems waste a large percent of the water supplied that never reaches the roots of plants requiring watering.

Specifically, the conventional hoses and sprinkling devices do not conserve valuable or precious water with a large percentage being lost to runoff, drainage and/or evaporation into the air.

The present invention provides a significant improvement over the conventional hoses and sprinklers to provide irrigation water from a remote water source directly to the roots of the plants while preventing runoff, drainage and/or evaporation waste of the water.

SUMMARY OF THE INVENTION

The present invention is directed to an improved irrigation device.

A second object of the present invention is to provide an improved irrigation device including a flexible soaker hose in combination with a support for holding the flexible soaker hose in a substantially fixed configuration.

A third object of the present invention is to provide an irrigation device including a flexible soaker hose in combination with a support connected to the flexible soaker hose to allow the configuration of the flexible soaker hose to be changed from one substantially fixed configuration to another substantially fixed configuration.

A fourth object of the present invention is to provide an irrigation device including a flexible soaker hose connected to a bendable support configured to allow the flexible soaker hose to be changed from one substantially fixed configuration to another substantially fixed configuration.

A fifth object of the present invention is to provide an irrigation device including a flexible soaker hose provided with a bendable support disposed therein.

A sixth object of the present invention is to provide an irrigation device including a soaker hose provided with a bendable metal conduit disposed therein.

A seventh object of the present invention is to provide an irrigation device including a soaker hose provided with a bendable metal conduit or wire therein.

An eighth object of the present invention is to provide an irrigation device including a soaker hose provided with a bendable support disposed within the wall of the soaker hose.

A ninth object of the present invention is to provide an irrigation device including a soaker hose provided with a bendable metal support incorporated within the wall of the soaker hose.

A tenth object of the present invention is to provide an irrigation system including a water source and a soaker hose connected to the water source and a support connected to the soaker hose to hold the flexible soaker hose in a substantially fixed configuration.

An eleventh object of the present invention is to provide an irrigation system including a water source, a soaker hose connected to the water source, and a bendable support connected to the soaker hose to allow the flexible soaker hose to be changed from a substantially fixed configuration to another substantially fixed configuration.

A twelfth object of the present invention is to provide an irrigation system including a water source, a supply hose connected to the water source, and at least one irrigation device connected to the supply hose, the irrigation device including the combination of a soaker hose and a support configured for holding the flexible soaker hose in a substantially fixed configuration.

A thirteenth object of the present invention is to provide an irrigation system including a water source, a supply hose connected to the water source, and at least one irrigation device connected to the supply hose, the irrigation device including the combination of a soaker hose and a bendable support configured for holding the flexible soaker hose in a substantially fixed configuration.

A fourteenth object of the present invention is to provide an irrigation system including a water source, a supply hose connected to the water source, and at least one irrigation device connected to the supply hose, the irrigation device including the combination of a soaker hose and a bendable metal support configured for holding the flexible soaker hose in a substantially fixed configuration.

The present invention is directed to an irrigation device. More specifically, the present invention is directed to an irrigation device configured to direct water to the roots of plants and minimize the loss of water to runoff, drainage and/or evaporation.

The irrigation device according to the present invention can be utilized to irrigate plants, bushes, shrubs, trees, crops and any other type of plant in need of irrigation. Preferably, the irrigation device according to the present invention is utilized above ground to minimize the installation time, and in some applications the removal time necessary for unassembly (i.e. for example when used with annual crops). However, the irrigation device according to the present invention can also be utilized below ground, and for example can be buried under the soil or placed within a shallow narrow trench and then buried.

The irrigation device according to the present invention is configured to be situated or located near the roots or root bulbs of the plants. A preferred embodiment utilizes a ring, hoop, or hook type configuration to at least partially or preferably totally encompass the roots or root bulbs of the plants to be irrigated. The hook type configuration is particularly preferred, since the irrigation device can be installed even around tall plants such as tall shrubs or trees, and is especially easy to install and uninstall. In another preferred embodiment, the irrigation device can be straight, snakeshaped, curved to fit around and/or between a row of plants.

The irrigation device according to the present invention utilizes a soaker hose in combination with a support. Specifically, the support is configured to hold the flexible soaker hose in a substantially fixed configuration. In a more preferred embodiment, the support is configured to support the flexible soaker hose in various or different substantially fixed configurations to allow flexibility in the application thereof. In a most preferred embodiment, the irrigation device includes a flexible soaker hose in combination with a support configured to allow the flexible soaker hose to be configured in almost an infinite substantially fixed and different configurations to allow for various types of installations or applications thereof.

In a preferred embodiment, the support is a separate piece or component added, inserted, incorporated or otherwise affiliated with the flexible soaker hose in some manner. For example, a bendable support, in particular a bendable metal support disposed within the flexible soaker hose or connected external to the flexible soaker hose are particularly desirable embodiments.

In other embodiments, the bendable support is partially or fully incorporated into the wall of the flexible soaker hose to make a substantially integrated construction. Preferably, the bendable support is embedded fully within the wall of the flexible soaker hose so that it is not exposed on the inner surface or outer surface wall of the soaker hose. In this manner, the bendable support would be protected from the environment and/or water contained within the soaker hose during use and/or storage. For example, one or more separate bendable metal wires and/or a metal mesh can be incorporated within the wall of the soaker hose to provide the bendable nature to the soaker hose. In a preferred embodiment, the bendable metal wire and/or metal mesh is inserted between one or more layers during the construction of the soaker hose, which is then later cut to length.

The present invention is directed to an irrigation system for watering plants. Preferably, the irrigation system according to the present invention incorporates at least one irrigation device according to the present invention. Preferably, a plurality of irrigation devices according to the present invention are incorporated into the irrigation system according to the present invention.

The irrigation system according to the present invention includes a water source and at least one irrigation device according to the present invention connected to the water source. The water source, for example, can be a faucet (internal or external) of a residence or building, a connection with a water well, a connection to a water pump fluidly connected to a water supply such as a lake, stream, river, a water tank or any other suitable or convenient water source.

In a preferred embodiment, the irrigation system according to the present invention includes a supply hose connecting to the water source to at least one irrigation device according to the present invention. Preferably, the supply hose is not a soaker or weep type hose, but instead is made of a hose material substantially impermeable to water. In this manner, water is substantially conveyed from the water source to at least one irrigation device according to the present invention without any water loss therebetween.

In a more preferred embodiment, the supply hose is provided with one or more connectors to allow for quick and/or releasably connection with at least one irrigation device according to the present invention. For example, the supply hose can be provided with one or more male and/or female hose connectors to couple with a male or female hose connector of the irrigation device according to the present invention. In a most preferred embodiment, the supply hose is provided with a plurality of separate hose connections spaced apart along the length of the supply hose. For example, the hose connections can be equally spaced, randomly spaced or spaced in some preferred pattern for various installations and/or applications. In some embodiments, the hose connectors can be moved along the length of the supply hose and/or plugged off again to provide a wide variety of installations and/or applications thereof.

The irrigation system according to the present invention can be provided with an in line plant food feeder at the water source and/or along the length of the supply hose to allow plant feeding to occur at the irrigation devices according to the present invention. In addition, the irrigation system according to the present invention can be also provided with a timer at the water source and/or along the length of the supply hose that can automatically turn on or turn off the irrigation system based on a preselected time sequence and/or activated due to daylight according to a preprogrammed routine.

BRIEF DESCRIPTION OF THE DRAWINGS

FIG. 4 is a top planar of a bendable support configured to be disposed within the irrigation device shown in FIGS. 1–3.

FIG. 5 is a top planar of a further embodiment of the irrigation device according to the present invention.

FIG. 6 is a cross-sectional view of a further embodiment of an irrigation device according to the present invention.

FIG. 7 is a cross-sectional view of an even further embodiment of the irrigation device according to the present invention.

FIG. 8 is a cross-sectional view of another further embodiment of the irrigation device according to the present invention.

FIG. 9 is a top planar diagrammatic view of an irrigation system according to the present invention.

FIG. 10 is a perspective view of an irrigation device in combination with a to water reservoir according to the present invention.

DETAILED DESCRIPTION OF PREFERRED EMBODIMENTS

Figure 1:
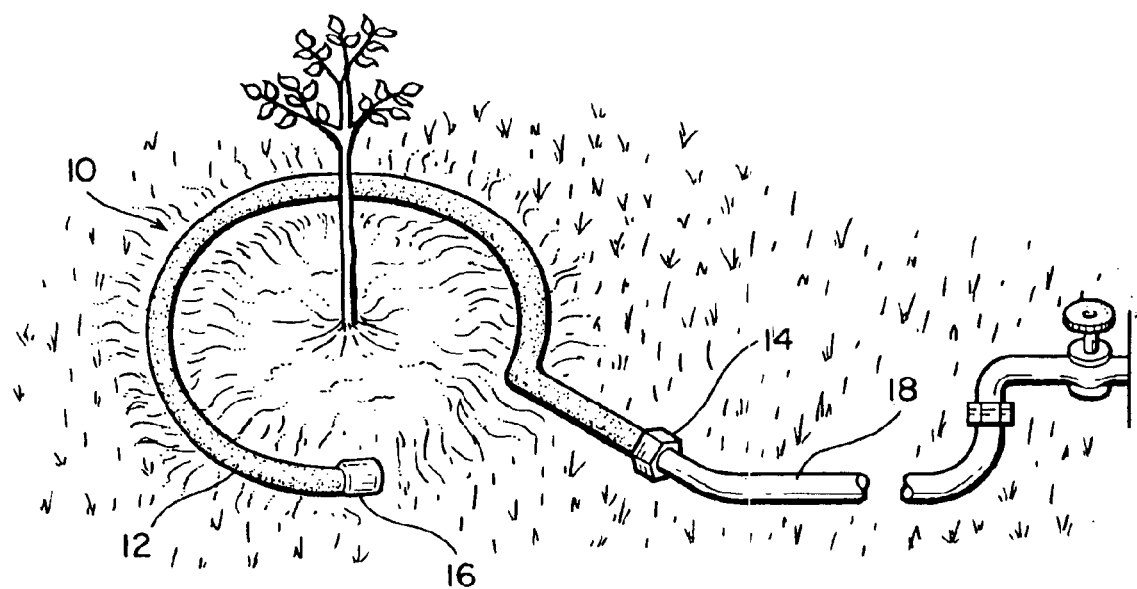
FIG. 1 is a perspective view of an embodiment of the irrigation device according to the present invention.

An irrigation device 10 according to the present invention is shown in FIG. 1.

The irrigation device 10 is configured to have a hook-type configuration as shown to allow the irrigation device 10 to be slipped around a plant P. In an alternative embodiment for relatively short height plants, the irrigation device 10 can be a hoop, ring, or spiral irrigation device in configuration.

The irrigation device 10 includes a flexible soaker hose 12 having a hose connection 14 (e.g. male type or female type) at one end, and a plug 16 at an opposite end. As an alternative, the plug 16 can be replaced by crimping the end of the flexible soaker hose 12, for example, with a metal fastener and/or by heat welding. A supply hose 18 is releasably connected to the irrigation device 10 via the hose connection 14. The hose 18 can be provided, for example, with a male type or female type hose connector to cooperate with the hose connection 14 of the irrigation device 10.

As shown in FIG. 1, the irrigation device 10 is placed around the plant P so as to direct water directly to the root or root bulb of the Plant. Specifically, the supply hose 18 is preferably a non-water permeable hose connected to a source of water (e.g. a faucet, water tank, water reservoir, water pump) so that no water is lost between the water source and the connection with the irrigation device 10. Water enters the irrigation device 10 through the hose connection 14 and reaches the plug 16, at which point water pressure builds up within the irrigation device 10, and the flexible soaker hose 12 begins to release water in a gradual controlled manner along the entire length of the flexible soaker hose 12. The water will permeate through the wall portion of the flexible soaker hose 12, and weep mainly down into the soil with very little loss due to runoff, drainage and/or evaporation. The irrigation device 10 is shown above ground, however, the irrigation device 10 can be located partially or fully below ground.

The flexible soaker hose is sufficiently flexible so that a support is needed or required to maintain the flexible soaker hose in a particular substantially fixed configuration. The support can be located inside the soaker hose 12, outside the soaker hose 12 and/or in the wall portion of the soaker hose 12. As shown in FIG. 3A, a bendable metal support 20, preferably made of copper, aluminum, bronze, galvanized steel or other suitable metal being sufficiently malleable and resistant to corrosion can be positioned within the flexible soaker hose 12, and the combination is bent into a specific configuration such as the hook-type configuration shown in FIGS. 1 and 2. In this configuration, the bendable metal support 20 will have the configuration as shown in FIG. 4 when located within the flexible soaker hose 12. The bendable metal support 20 can be conduit, as shown, or can have any other suitable configuration (e.g. bar, plate, wire, mesh, bar, stranded, spring or combination of different types of bendable metal sections connected together).

As shown in FIG. 3A, the soaker hose 12 is provided with a soaker hose flow passageway 12a through and along the length of the soaker hose 12. The bendable metal support 20 shown as a conduit is provided with a conduit flow passageway 20a through and along the length of the conduit. It is noted that the outer diameter of the conduit is less than the inner diameter of the soaker hose 12. An annular-like flow passageway 15 is defined between the outer surface 20b of the conduit and the inner surface 12b of the soaker hose.

Figure 3A:
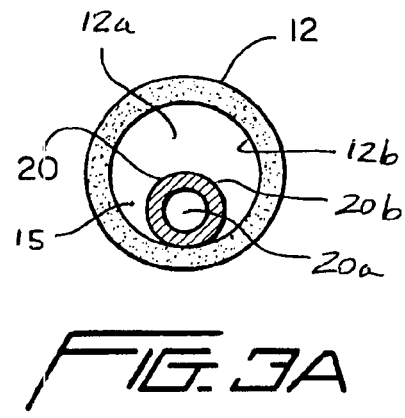
FIG. 3A is a cross-sectional view of the irrigation device as indicated in FIG. 1.
Figure 3B:
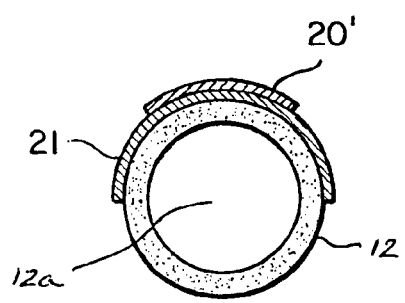
FIG. 3B is a cross-sectional view of another embodiment of the irrigation device according to the present invention.

As shown in FIG. 3B, a bendable metal support 20' can be applied external to the flexible soaker hose 12, for example, by use of adhesive and/or heat bonding. Optionally or alternatively, a water impermeable coating or layer 21 is provided on an upper portion of the flexible soaker hose 12 to only allow water to weep or soak out of a lower portion of the flexible soaker hose 12 to direct water only in the direction of the roots or root bulb of the plant being watered. The layer 21 maybe applied before or after the flexible soaker hose 12 is bent into a particular substantially fixed configuration. The layer 21 can be substantially rigid or flexible depending on applications. A substantially rigid layer applied after bending the flexible soaker hose 12 can be partially or fully responsible for holding the substantially fixed configuration of the irrigation device 10.

Figure 2:
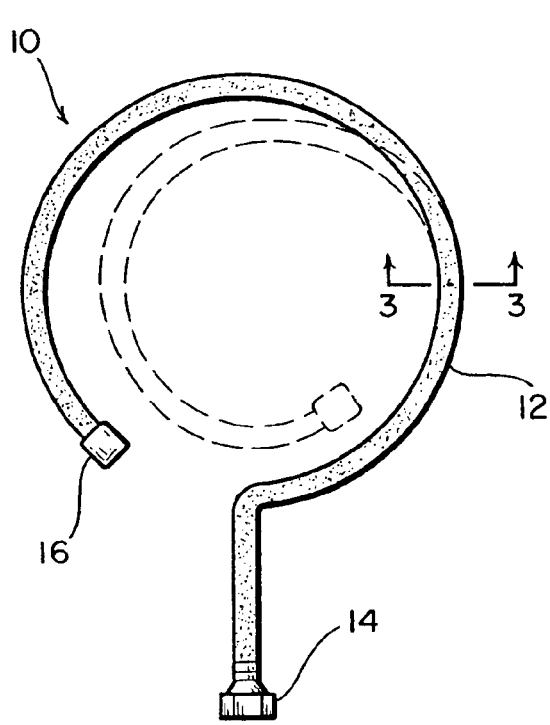
FIG. 2 is a top planar view of the irrigation device shown in FIG. 1.

The bendable support 20 is configured to hold the flexible soaker hose 12 in a substantially fixed configuration as shown in FIGS. 1 and 2 (i.e. hook-type configuration). Further, the support 20 is preferably a bendable support to allow the irrigation device 10 to be bendable from one substantially fixed configuration to another substantially fixed configuration (i.e. from hook-type configuration to a spiral-type configuration), as shown in FIG. 2. Further, the shape of the irrigation device 10 can be changed from a substantially circular shape to an oblong, rectangular, triangular or other suitable shape.

In an alternative embodiment, as shown in FIG. 5, the irrigation device 10' utilizes an external support 22 having a plurality of separate lug or anchors 24 for securing the flexible soaker hose 12 to the external support 22. The external support 22 can be configured to be substantially rigid or substantially flexible. For example, the external support 22 can be a plastic injection molded article having integrally molded lugs 24 or separate metal fasteners for securing the flexible soaker hose 12 thereto. Again, the irrigation device 10' can be installed above ground, partially in the ground or below ground.

In alternative embodiments, as shown in FIGS. 6–8, one or more supports are provided within the wall of the flexible hose 22. Depending upon the application, the supports can be substantially rigid to hold the flexible soaker hose in one substantially fixed configuration, or bendable to allow the flexible soaker hose to be bent from one configuration to another configuration.

In the embodiment shown in FIG. 6, four (4) equally spaced supports 20" are disposed within the wall portion of the soaker hose 12". The supports 20" are shown as having circular-cross sections, however, other cross-sectional shapes and/or sizes can be utilized. The supports 20" can be substantially rigid (e.g. made of tempered metal, rigid plastic, fiberglass, kevlar, carbon fiber, or other suitable composites), or can be configured to be bendable (e.g. made of malleable metal such as copper, aluminum, bronze, galvanized steel). Alternatively, the supports 20" can be tailored to be somewhat rigid and somewhat bendable by making them from composite materials (e.g. malleable metal strands in combination with kevlar or fiberglass fibers).

In the embodiment shown in FIG. 7, the supports 20''' are more slender but wider so that they can be further embedded within the wall of the flexible soaker hose 12''', to prevent corrosion thereof. The cross-sectional configuration including the cross-sectional shape and/or size, will dictate various characteristics regarding the bendable nature of the soaker hose 12''', and can be varied for different applications.

In the embodiment shown in FIG. 8, a support 20'''' is shown as a wire or fiber mesh integrated as a unit or layer within the wall thickness of the soaker hose 12''''.

An irrigation system 30 according to the present invention is shown in FIG. 9. Preferably, the irrigation system 30 utilizes one or more irrigation devices 10 according to the present invention. Specifically, a water impermeable supply hose 32 is provided with a plurality of separate hose connectors 34 coupled with variable flow valves 36 (e.g. shut off valves) along the length of the supply hose 32. As shown in FIG. 9, a pair of hose connectors 34 are located along the length of the supply hose 32, however, individual hose connectors 34 can be located along the supply hose 32. As an alternative to the embodiment shown, the irrigation device 10 on the right-hand side of FIG. 9 can be replaced with another supply hose 32 having one or more irrigation devices, for example, to double, triple, etc. the size of the system.

In the embodiment shown in FIG. 9, one or more of the installed irrigation devices 10 can be disconnected from the supply hose 32 with the particular hose connector 34 in the shut off position to prevent water leakage therefrom. Thus, various configurations can be arranged with regards to the irrigation devices 10 being positioned along the length and/or on either side of the supply hose 32 depending on the desired location of the plants to be planted, or the location of existing plants. The location of the irrigation devices 10 along the length of the supply hose can be equal distance (i.e. three sets on the right-hand side of supply hose 32) or variably spaced (i.e. three sets of irrigations devices 10 along the left-hand side of supply hose 32).

The supply hose 32 is provided with a hose connector 38. Optionally, the supply hose 32 can be provided with an in-line nutrient feeder 40 (e.g. plant food) and/or an in-line timer 42 capable of turning on and turning off the water to the supply hose 32 on a preset interval or preprogrammed intervals.

In a more advanced embodiment, the hose connectors 34 are configured to be movable to additional various points along the supply hose 32, or can be configured to even be slidable to any position along the supply hose 32 to allow exact positioning of the irrigation devices 10 relative to the plants to be watered.

In the embodiment shown in FIG. 10, an in-line water reservoir 44 is connected to the irrigation device 10. The water reservoir shown as a separate component from the irrigation device, however, in another embodiment these two separate components are constructed or made as a single unit. The water reservoir 44 is provided with an air vent 46 to allow air to escape as water is added to the water reservoir 44, and to allow air to enter the water reservoir 44 when the water level is dropping therein. Alternatively, the air vent can be deleted or a valve (e.g. a one way valve) can be provided to create air pressure above the water level. In use, water is supplied to the water reservoir 44 via the supply hose 18. As the height of the water within the water reservoir 44 continues to rise, a sufficient pressure head is created to force water into the irrigation device 10. When the water reservoir 44 is filled, the water supply to the supply hose 18 is turned off, and water is allowed to drain from the water reservoir 44 continuously into the irrigation device 10 over a period of time (e.g. from hours to days depending on the configuration of the water reservoir 44 and irrigation device 10). In a more advanced embodiment, the water reservoir 44 is provided with a gauge for detecting the level of water within the water reservoir 44 which can automatically signal an electrically operated controlled valve cutting off the supply of water from the supply hose 18 into the water reservoir 44. This type of system would allow for intermittent water supply, for example, from a pump supplied by a pond or lake and run only on an intermittent basis. Thus, in this particular embodiment water is both stored at or near the plant while irrigation is slowly occurring.

Optionally, the water reservoir can be provided with a closure, for example, a fill 48 and cap 50 to allow water to be added from another hose, bucket, funnel (e.g. rain collector) alternatively or in addition to the hose 18. In some applications, hose 18 may be removed and plugged off. As a further option, a hand operated air pump 52 can be provided to the water reservoir to allow air pressure to be applied within the water reservoir when the air vent 46 and hose 18 are plugged off to assist flow through the irrigation device 10.

Figure 11:
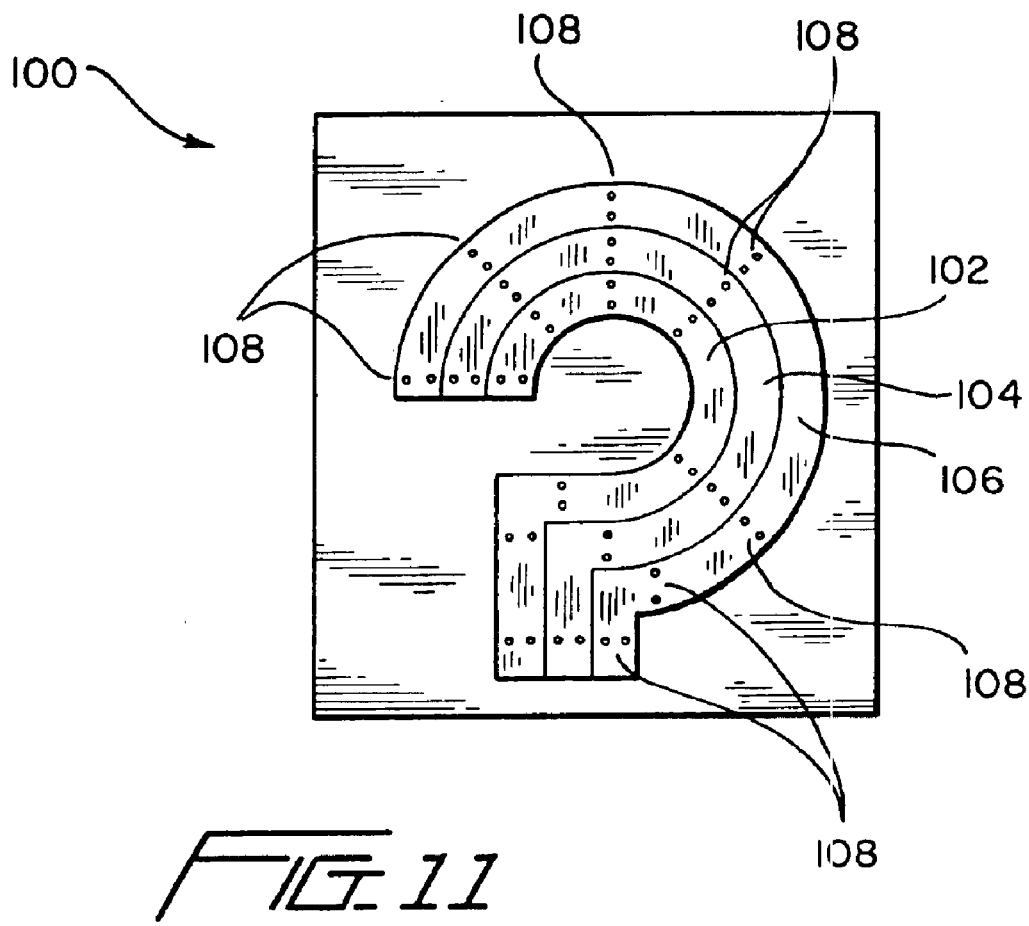
FIG. 11 is a top planar view of a sheet containing three (3) supports which can be separate therefrom for making different size supports for the irrigation device according to the present invention.
Figure 12:
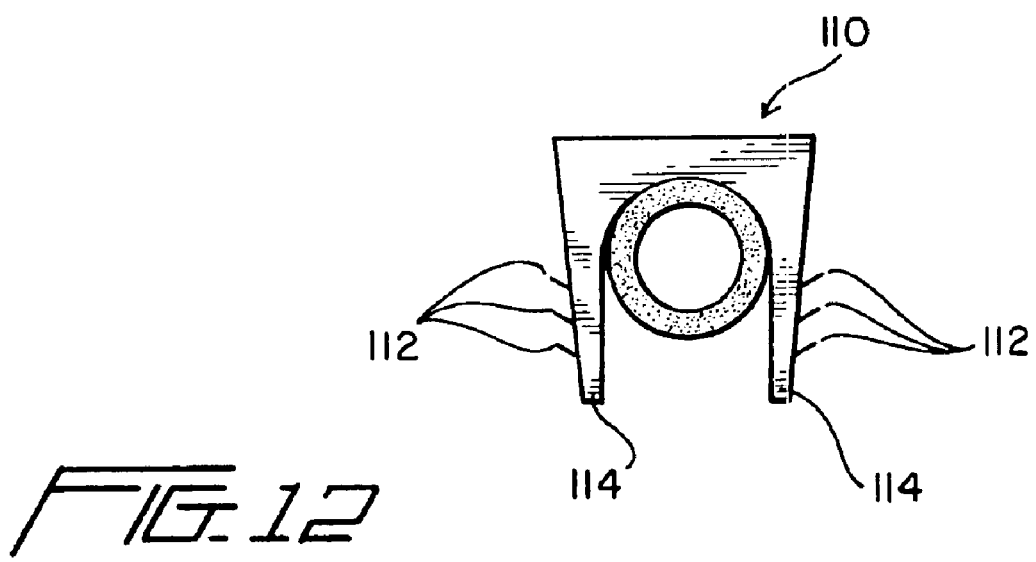
FIG. 12 is a side elevational view of a lug or anchor configured for connecting the soaker hose to the support shown in FIG. 11.

A variable or multiple size support 100, for use with the embodiment shown in FIG. 5, is shown in FIG. 11. The support 10, for example, is a sheet (e.g. metal and/or plastic and/or ceramic) having three (3) different size hoop shaped supports 102, 104 and 106 disposed therein. For example, the support 100 is configured so that the supports 102, 104 and 106 break away from the support 100 and themselves so that a particular size support for a particular application can be selected.

The supports 102, 104 and 106 are provided with pairs of through holes 108 to allow attachment of a flexible soaker hose 12, the same or similar to that shown in FIG. 5. A plurality of separate lugs or anchors 110 are supplied for securely connecting the flexible soaker hose 12 to the supports 102, 104 and 106. The anchors 110 are provided with protrusions 112 (e.g. hooks or barbs) provided on legs 114 to cooperate with the lower edges of the through holes 108 during assembly.

Operation

In the embodiment shown in FIG. 1, the supply hose 18 is coupled to the faucet (as shown) and the irrigation device 10. The faucet is opened and water flows along the water impermeable supply hose 18 to the irrigation device 10 until it reaches the plug 16. The water will continue to flow to the plug 16 until more or less the pressure within the water supply hose 18 is reached. The flexible soaker hose 12 will begin to weep allowing for a very slight controlled flow therefrom into the ground. The upper surface of the flexible soaker hose 12 can potentially be sealed or covered with a water impermeable layer so that only water drains from a lower portion of the flexible soaker hose. In this manner, water from a remote source is transported directly to the plant without any waste via the water impermeable hose 18, and then controllably released to the roots of the plants with a minimum loss due to water runoff, drainage and/or evaporation into the air. Thus, this particular irrigation device and irrigation system according to the present invention is highly efficient with regards to preventing the loss of water to the environment minimizing the amount of water consumption to effectively irrigate plants.

What is claimed is:

1. An irrigation device, comprising:

a flexible soaker hose configured to be connected to a water supply, said soaker hose having a soaker hose flow passageway configured for accommodating water flow through and along a length of said soaker hose; and a bent support extending continuously along a substantial length of said soaker hose and associated with said soaker hose, said bent support configured to maintain said soaker hose in a substantially fixed bent configuration during use, said support being a conduit having a conduit flow passageway for water flow through and along a length of said conduit, said conduit being located within said soaker hose flow passageway of said soaker hose; wherein an outer diameter of said conduit is less than an inner diameter of said soaker hose to provide an annular-like flow passageway between an outer surface of said conduit and an inner surface of said soaker hose; wherein said bent support is configured to allow the irrigation device to be changed from one substantially fixed bent configuration to another substantially fixed bent configuration.

2. A device according to claim 1, wherein said support extends along the entire length of said soaker hose.

3. A device according to claim 1, wherein said support is configured to allow said soaker hose to be bent into different shapes.

4. A device according to claim 1, wherein said bent support is a further bendable support located within said soaker hose.

5. A device according to claim 1, wherein said conduit is a bendable metal conduit.

6. A device according to claim 5, wherein said bendable metal conduit is made from one selected from the group consisting of copper, copper alloy, bronze, aluminum, aluminum alloy, steel, steel alloy and galvanized steel.

7. A device according to claim 1, including at least one hose connection connected to said soaker hose.

8. A device according to claim 1, including at least one hose connection connected to one end of said soaker hose, and an opposite end of said soaker hose is plugged.

9. A device according to claim 1, wherein said device is configured in a hook type configuration.

10. A device according to claim 1, wherein an upper portion of said soaker hose is configured to be water impermeable to allow water to only soak through and out of a lower portion of said soaker hose.

11. An irrigation system, comprising:
a water supply;
at least one soaker hose configured to be connected to said water supply, said soaker hose having a soaker hose flow passageway configured for accommodating water flow through and along a length of said soaker hose; and
a bent support extending continuously along a substantial length of said soaker hose, said bent support configured to maintain said soaker hose in a substantially fixed bent configuration during use, said support, being a conduit having a conduit flow passageway for water flow through and along a length of said conduit, said conduit being located within said soaker hose flow passageway of said soaker hose; wherein an outer diameter of said conduit is less than an inner diameter of said soaker hose to provide an annular-like flow passageway between an outer surface of said conduit and an inner surface of said soaker hose; wherein said bent support is configured to allow the irrigation system to be changed from one substantially fixed bent configuration to another substantially fixed bent configuration.

12. A system according to claim 11, including a supply hose connected to said soaker hose.

13. A system according to claim 11, wherein said supply hose is made of hose material configured not to leak.

14. A system according to claim 11, wherein a plurality of said soaker hose is connected to said supply hose.

15. A system according to claim 14, wherein said supply hose is provided with a plurality of hose connections and said soaker hoses are each provided with a hose connection to allow said soaker hoses to be releasably connected to said supply hose.

\* \* \* \* \*